US005245902A

United States Patent [19]

Pereira

[11] Patent Number: 5,245,902

[45] Date of Patent: Sep. 21, 1993

[54] VEGETABLE CUTTER

[76] Inventor: Camilo Pereira, Flagler Center Bldg., Suite 112, 350 W. Flagler St., Miami, Fla. 33130

[21] Appl. No.: 16,945

[22] Filed: Feb. 12, 1993

[51] Int. Cl.[5] .......... A47J 17/00; B26D 3/26

[52] U.S. Cl. .......... 83/437; 83/425.3; 83/662; 83/858; 83/932; 99/509; 99/537

[58] Field of Search .......... 99/495, 537, 538, 547, 99/567, 585, 588; 83/404.3, 404.1, 407, 420, 437, 425.3, 662, 858, 859, 932

[56] References Cited

U.S. PATENT DOCUMENTS

| | | | |
|---|---|---|---|
| 533,164 | 1/1895 | Criswell | 83/437 |
| 2,153,407 | 4/1939 | Bell | 83/437 |
| 2,407,924 | 9/1946 | Garfunkel | 83/437 |
| 2,470,934 | 5/1949 | La Bat | 83/437 |
| 3,216,474 | 11/1965 | Popeil | 83/662 |
| 3,468,355 | 9/1969 | Hall | 99/537 X |
| 3,830,151 | 8/1974 | Gerson | 99/537 |
| 3,924,501 | 12/1975 | Cohen et al. | 83/662 X |
| 4,062,260 | 12/1977 | Steinhogl | 83/425.3 X |
| 4,436,025 | 3/1984 | Jones | 99/537 X |
| 4,573,384 | 3/1986 | Jones | 83/858 X |

*Primary Examiner*—Timothy F. Simone
*Attorney, Agent, or Firm*—Malloy & Malloy

[57] ABSTRACT

A vegetable cutter which includes a base with a through hole and a knife unit spanning the through hole which confronts a downwardly facing ram moveable between a food charging position and a food slicing position by manipulating a lever-type handle pivotally to apply pressure to the ram head and with guide means included to constrain the ram head to vertical movement of translation only.

4 Claims, 1 Drawing Sheet

FIG. 1
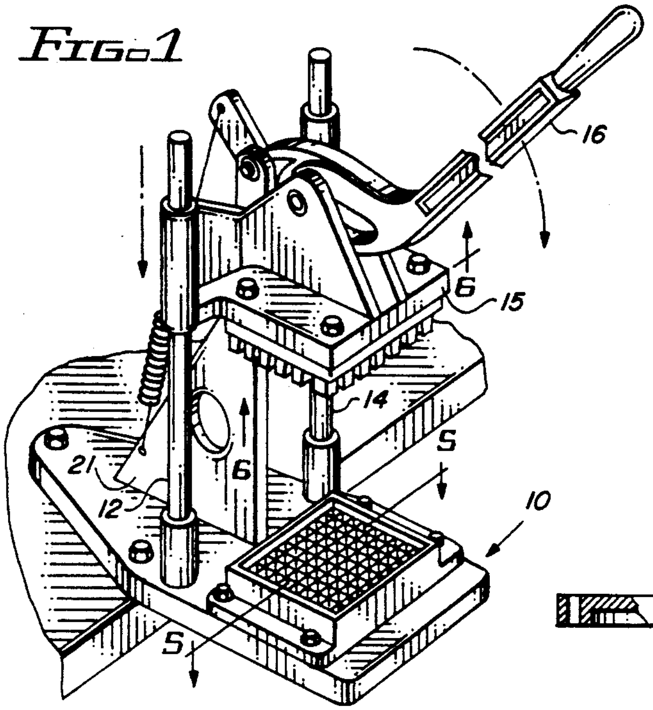
FIG. 2
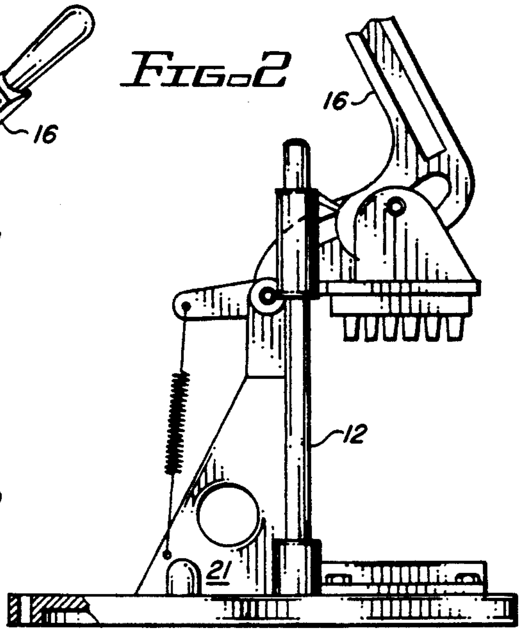
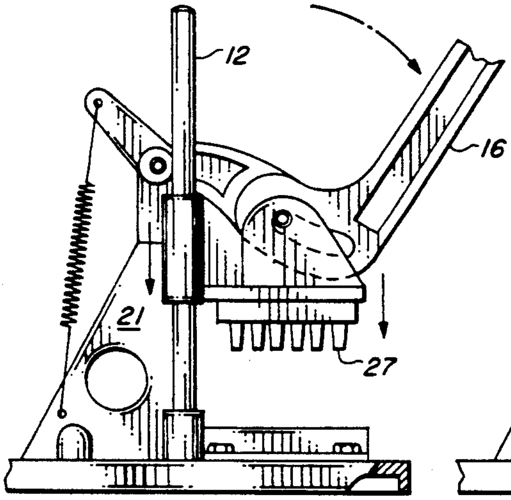
FIG. 3
FIG. 4
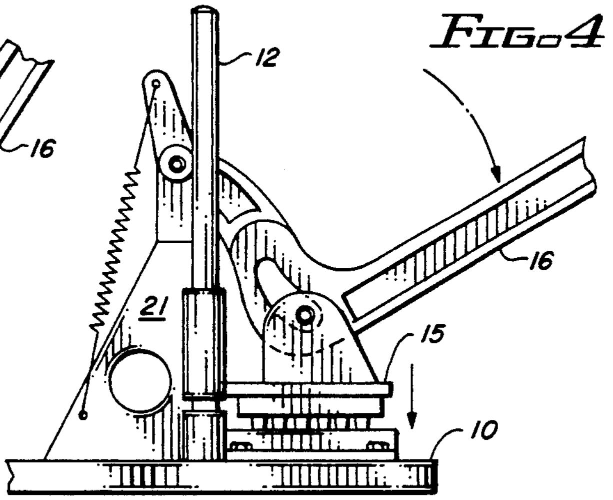
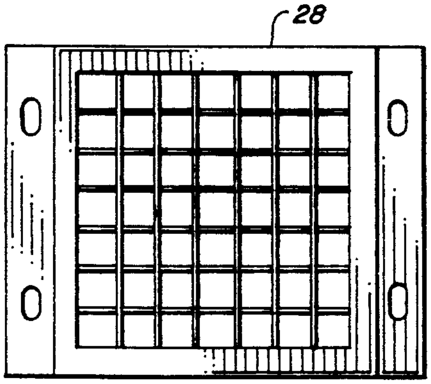
FIG. 5
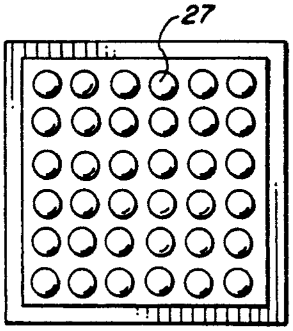
FIG. 6

VEGETABLE CUTTER

FIELD OF THE INVENTION

This invention relates to a vegetable cutter.

SUMMARY OF THE INVENTION

In the art, it is well known to provide vegetable cutters. This invention is of such a vegetable cutter which is of inexpensive construction yet strong and durable. In general, it includes a base and a support tower extending vertically between two guide rods to which a head is slidably connected and constrained thereby to vertical movement only while a handle is connected to the tower with a connection at the head in the form of a clevis-type pin and cam slot so that when the handle is moved, the head is also moved downwardly so that a grid of knives cut an article such as a potato into a selected type of potato chip.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the vegetable cutter.

FIG. 2 is a side elevation view of the vegetable cutter.

FIG. 3 is a partial view which illustrates the operation of the cutter.

FIG. 4 is a view similar to FIG. 3 with the cutter handle in a different attitude.

FIG. 5 is a view taken on the plane which includes the arrowed line 5—5.

FIG. 6 is a bottom view taken on the plane indicated by the arrowed line 6—6 of FIG. 1 and looking in the direction of the arrows.

Like reference numerals refer to like parts throughout the several views of the drawings.

DESCRIPTION OF THE PREFERRED EMBODIMENT

As seen in FIG. 1, the cutter includes a base 10 with guide rods extending vertically in spaced relation from one another 12 and 14 to which there is telescopically connected through bushings a ram or head 15 which is operable by means of a handle 16 connected to it and to a support tower 21. When the handle is rotated in the direction of the arrowed lines, the head will be constrained to vertical movement between a cutting position and a position for charging the cutter. A vegetable such as a potato is positioned on the knife grid or knife unit 28 and when the head is moved down, it rams the potato downwardly forcing the meat to be sliced by the knife blades. The ram fingers such as 27 are received in the knife grid 28. The knife grid, see FIG. 5 where it is designated by the numeral 28, is attached as by screws to the base of the unit, see FIGS. 1 and 5, where it is seen that the grid consists of a plurality of connected, edge-wise, upright cutting blades each having upwardly facing cutting edges which define a plurality of uniformed apertures. It is seen that the fingers are adapted on this vertical movement to which the head is constrained to matingly correspond to the apertures.

It is thus seen that the construction described herein is structured to achieve a strong, sturdy vegetable cutter which is nevertheless of inexpensive construction. The configuration of the support tower and its relative size is such as to stabilize the device in use and permits strong pressures to be applied.

While this invention has been shown and described in what is considered to be a practical and preferred embodiment, it is recognized that departures may be made within the spirit and scope of this invention which should, therefore, not be limited except as set forth herein and within the doctrine of equivalents.

What is claimed is:

1. A vegetable cutter comprising:

a base having upper and lower surfaces and front rear and side surfaces and said base including means to mount said cutter to a support surface, said base having a generally rectangular through opening adjacent the front surface, a knife unit spanning the opening and removably fixed to said base, a plate-type support generally midway between the side surfaces and said support having an upper end zone, said support extending from said opening towards said rear surface and generally midway between said side surfaces, a pair of spaced guide rods on said upper surface, one on each side of said support, a pusher head above said opening and having a bushing telescopically received on each of said guide rods to constrain said head to vertical movement only into and out of slicing relation with said knife unit, an elongate handle having a first end zone, intermediate zone, and a second end, said intermediate zone having a curved outer surface and an elongate cam slot, pin means in the slot and interconnecting the handle and head, means pivotally connecting the first end zone of said handle to said support for swinging movement of the handle to move the pusher head downwardly into mating relation with the knife unit, and biasing means normally urging said pusher head away from said knife unit.

2. A vegetable cutter as set forth in claim 1 wherein means are provided on said base for changing said knife unit and cleaning it.

3. A vegetable cutter as set forth in claim 1 wherein said plate-type support is generally triangular as seen in elevation and extends downwardly and rearwardly from said means pivotally connecting to said base.

4. A vegetable cutter as set forth in claim 1 wherein the knife unit includes a plurality of connected, edge wise, upright cutting blades each having upwardly facing cutting edges which define a plurality of generally uniform apertures.

* * * * *